United States Patent
Davis

(10) Patent No.: US 10,337,197 B2
(45) Date of Patent: Jul. 2, 2019

(54) SYSTEM AND METHOD OF GENERATING WAVE

(71) Applicant: Allen Tanner Davis, Orlando, FL (US)

(72) Inventor: Allen Tanner Davis, Orlando, FL (US)

( * ) Notice: Subject to any disclaimer, the term of this patent is extended or adjusted under 35 U.S.C. 154(b) by 43 days.

(21) Appl. No.: 15/625,381

(22) Filed: Jun. 16, 2017

(65) Prior Publication Data

US 2017/0362842 A1    Dec. 21, 2017

Related U.S. Application Data

(60) Provisional application No. 62/351,783, filed on Jun. 17, 2016.

(51) Int. Cl.
| | | |
|---|---|---|
| *E04H 4/00* | (2006.01) | |
| *A63B 69/00* | (2006.01) | |
| *A63G 31/00* | (2006.01) | |
| *A63B 69/12* | (2006.01) | |

(52) U.S. Cl.
CPC ......... *E04H 4/0006* (2013.01); *A63G 31/007* (2013.01); *A63B 69/0093* (2013.01); *A63B 69/125* (2013.01)

(58) Field of Classification Search
CPC .. E04H 4/0006; A63B 69/0093; A63G 31/007
USPC ........................................................ 405/79
See application file for complete search history.

(56) References Cited

U.S. PATENT DOCUMENTS

| | | | |
|---|---|---|---|
| 4,905,987 A | 3/1990 | Frenzi | |
| 5,738,590 A * | 4/1998 | Lochtefeld | A63B 69/0093 |
| | | | 472/117 |
| 6,019,547 A * | 2/2000 | Hill | A63G 31/007 |
| | | | 4/491 |
| 6,336,771 B1 * | 1/2002 | Hill | A63G 31/007 |
| | | | 405/79 |
| 6,460,201 B1 * | 10/2002 | Lochtefeld | E04H 4/0006 |
| | | | 4/491 |
| 8,375,477 B2 * | 2/2013 | Johnson | E04H 4/0006 |
| | | | 4/491 |
| 8,496,403 B2 * | 7/2013 | Lochtefeld | E04H 4/0006 |
| | | | 4/491 |
| 8,523,484 B2 | 9/2013 | McFarland | |
| 9,068,371 B2 | 6/2015 | McFarland | |
| 2003/0180095 A1 * | 9/2003 | McFarland | A63G 3/02 |
| | | | 405/79 |
| 2008/0060123 A1 * | 3/2008 | Johnson | A63B 69/0093 |
| | | | 4/491 |

(Continued)

FOREIGN PATENT DOCUMENTS

WO    WO2013083259    6/2013

OTHER PUBLICATIONS

PCT International Searching Authority; International Search Report and Written Opinion dated Sep. 12, 2017; entire document.

*Primary Examiner* — Tara Mayo-Pinnock
(74) *Attorney, Agent, or Firm* — Terry M. Sanks, Esq.; Beusse Wolter Sanks & Maire, PLLC

(57) ABSTRACT

A wave-forming system includes a channel having a water inlet and a water outlet for directing water from the water inlet and the water outlet. The channel has a side wall and a bottom surface profile that slopes downward toward the water outlet and the side wall. The system also includes a back pressure barrier positioned in the water outlet to introduce a back pressure to the water flow inside the channel to continuously form waves across the channel.

24 Claims, 10 Drawing Sheets

(56) References Cited

U.S. PATENT DOCUMENTS

| | | |
|---|---|---|
| 2008/0089744 A1 | 4/2008 | McFarland |
| 2010/0088814 A1* | 4/2010 | Johnson ............ A63B 69/0093 4/491 |
| 2011/0099707 A1 | 5/2011 | Klimaschewski |
| 2012/0201605 A1 | 8/2012 | Hill |

* cited by examiner

SYSTEM AND METHOD OF GENERATING WAVE

CROSS-REFERENCE TO RELATED APPLICATION

This application claims the benefit of U.S. Provisional Patent Application Ser. No. 62/351,783 filed on Jun. 17, 2016, the contents of which are herein incorporated by reference in their entirety.

FIELD OF THE INVENTION

The present invention relates to wave generating systems, and more particularly, to a wave generating system for generating waves suitable for surfers and other wave-riding sports.

BACKGROUND OF THE INVENTION

Interest in the sport of surf-riding has increased at a rapid rate. As surfing and other wave-riding based sports have become more popular, demand for artificial waves has increased. While some attempts have been made to create artificial waves for surfers and other wave-riding sports, the waves created so far have not been able to simulate well the natural waves of these activities. The artificial waves created by current wave-generating apparatuses usually have limited shapes, sizes, speeds, and other features of wave profile or control thereof. Further improvements are possible for systems and methods of wave generation.

SUMMARY OF THE INVENTION

In view of the foregoing, it is an object of the present invention to provide a system and method of generating artificial waves that are close mimics of natural waves. According to one embodiment of the invention, a wave-forming system includes a channel having a water inlet and a water outlet for directing water from the water inlet and the water outlet. The channel has a side wall and a bottom surface profile that slopes downward toward the water outlet and the side wall. The system also includes a back pressure barrier positioned in the water outlet to introduce a back pressure to the water flow inside the channel to continuously form waves across the channel.

According to another embodiment of the present invention, the method of generating waves provides a channel having a water inlet and a water outlet, a side wall, and a bottom surface profile that slopes downward toward the water outlet and the side wall. A water flow is directed from the water inlet to the water outlet. A back-pressure barrier is positioned in the water outlet to introduce a back pressure applied to the water flowing inside the channel. Waves are thus continuously formed across the channel.

These and other objects, aspects and advantages of the present invention will be better appreciated in view of the drawings and following detailed description of preferred embodiments.

DETAILED DESCRIPTION OF THE PREFERRED EMBODIMENTS

Figure 1:
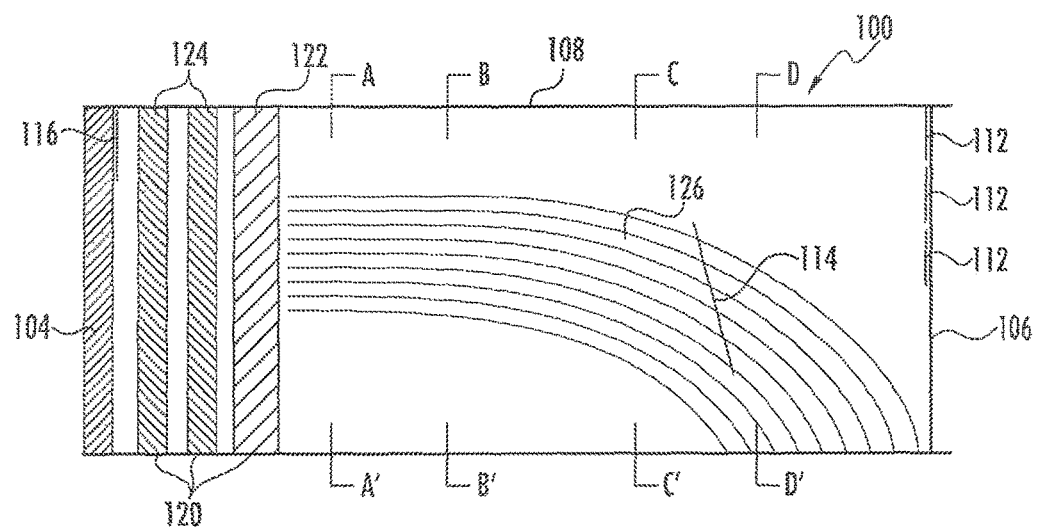
FIG. 1 is a top view of a wave generating system illustrating a channel bottom surface profile, according to one embodiment of the present invention.
Figure 2:
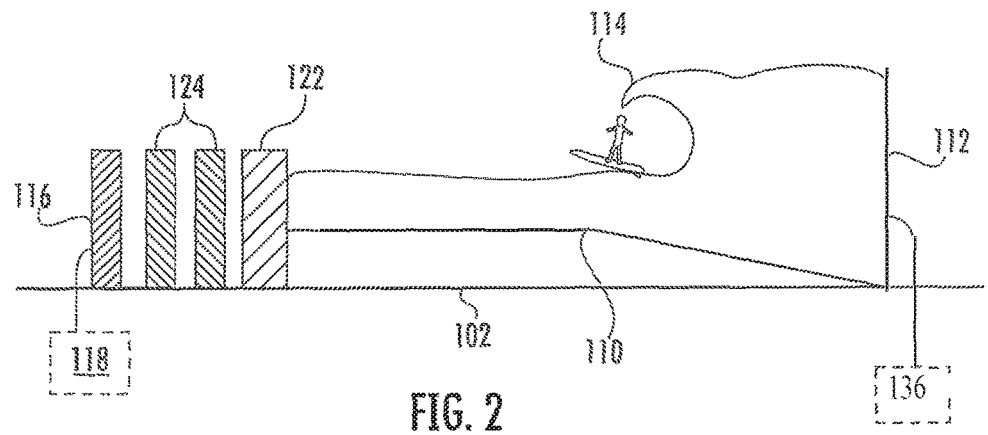
FIG. 2 is a side view of a wave generating system of FIG. 1.
Figure 3:
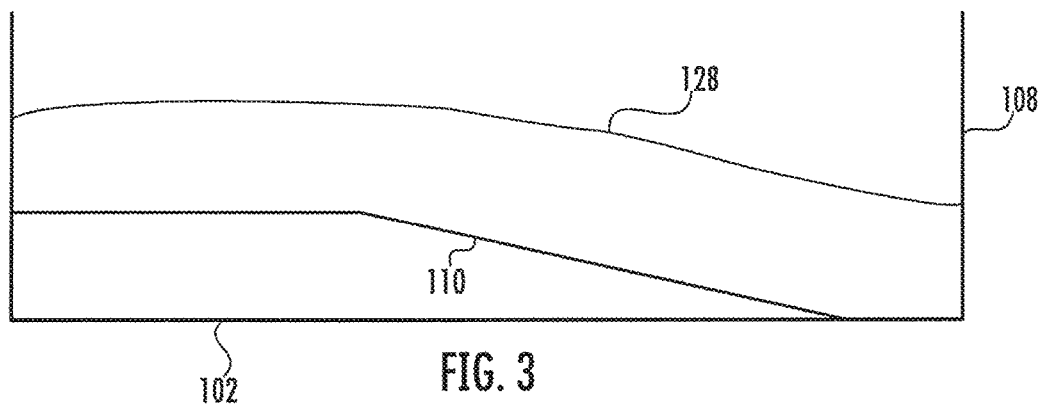
FIG. 3 is a cross-sectional view of the wave generating system of FIG. 1 taken along line A-A'.
Figure 4:
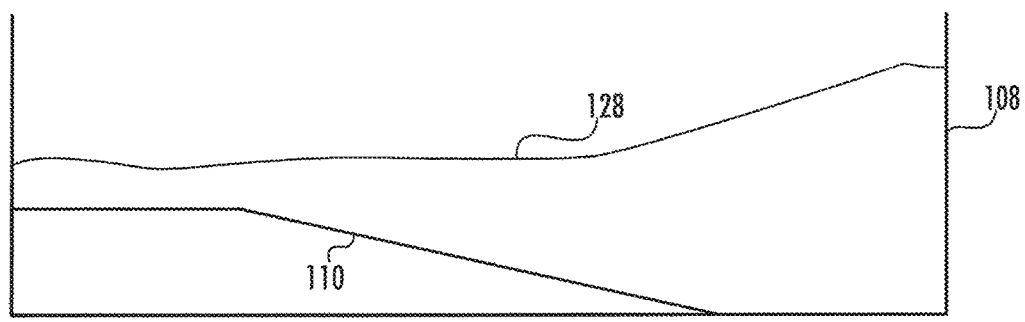
FIG. 4 is another cross-sectional view of the wave generating system of FIG. 1 taken along line B-B'.
Figure 5:
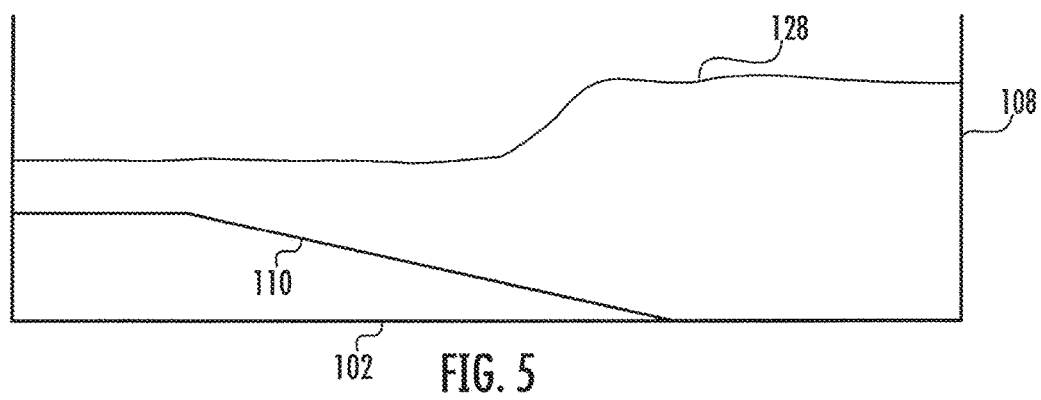
FIG. 5 is another cross-sectional view of the wave generating system of FIG. 1 taken along line C-C'.
Figure 6:
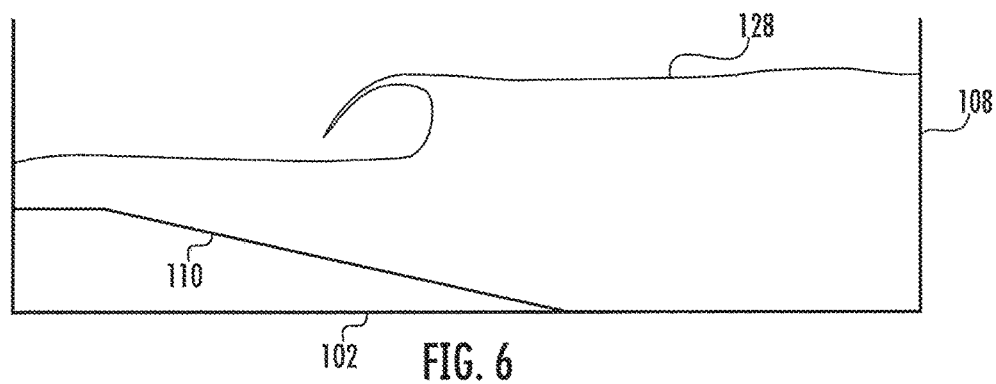
FIG. 6 is another cross-sectional view of the wave generating system of the FIG. 1 taken along line D-D'.

According to one embodiment of the present invention, referring to FIGS. 1-2, a wave-forming system 100 includes a channel 102 having a water inlet 104 and a water outlet 106 for directing water therebetween. The channel 102 has a side wall 108 and a bottom surface 110 having a surface profile that slopes downward toward the water outlet 106 and the side wall 108. The system 100 also includes a back-pressure barrier 112 positioned at the water outlet 106 to introduce a back pressure to the water flowing inside the channel 102 for the continuous formation of waves 114 across the channel 102.

One or more vector gates 116 can be positioned at certain locations at the water inlet 104 to further adjust water flow at the water inlet 104 to achieve a desired wave profile. In the depicted embodiment, a vector gate 116 is positioned in proximity to the sidewall 108 at the water inlet 104. The position and/or orientation of the one or more vector gates 116 can be adjusted via a gate controller 118.

One or more flow conditioners 120 such as filters 122 and/or vanes 124 can be implemented at the water inlet 104. For example, one or more filters 122 can be implemented at the water inlet 104 to provide a desired resistance to water flow and decrease water turbulence. As another example, one or more vanes 124 can be used to direct water flow to a desired direction as water passes through the water inlet 104. The water is preferably orientated toward the side wall 108 when flowing through the channel 102. The conditions of the water (e.g., flow speed, flow volume, hydraulic pressure, and flow laminate level, etc.) at the water inlet 104 will partially determine the wave profile (e.g., type, size, shape, speed, etc.) generated in the channel 102.

The bottom surface 110 is preferably smooth to facilitate laminar flow. The profile of the bottom surface 110 is indicated by bathymetry lines 126. As shown, bathymetry lines 126 illustrates that the bottom surface 110 slopes downward and toward the sidewall 108 at different rates, depending on locations of the channel 102. Example slopes can be in the 1:2-1:10 range. The slope of the bottom surface 110 can be adjusted to mimic the bathymetry of natural wave formation or to be custom designed to create a custom wave for surfers with diverse levels of experience. A shallow slope angle will create gentle waves, while a steeper slope angle will create waves that curl over to create an interior portion (e.g., barreling waves).

The back-pressure barrier 112 can create a back pressure to slow down a portion of water flow so that an upper layer of slow-moving water will meet with a lower layer of fast-moving water, thereby generating a hydraulic jump. The hydraulic jump can partially determine the form of waves, such as size, speed, and shape. The back-pressure barrier 112 can be extended perpendicular to the direction of water flow, as shown in FIG. 1, or at angles relative to the direction of the water flow. Examples of the angles include+/−0-5, 5-10, 10-15, 15-20, 20-25, 25-30, 35-40, 40-45, 45-50, 50-55, 55-60, 60-65, 65-70, 70-75, 75-80, and 80-85 degrees relative to the direction of water flow inside the channel 104. The back-pressure barrier 112 can be planar or include a curved surface (e.g., concave curve, convex curve, etc.). The dimension of the back-pressure barrier 112 will also partially influence the profile of the wave (e.g., size, speed, style).

The back-pressure barrier 112 can include one or more independently-positionable panels. The position and/or orientation of the back-pressure barrier 112 can be adjusted by a back-pressure barrier controller 136. By adjusting the position and/or orientation of the back-pressure barrier 112, the speed and orientation the hydraulic jump can be adjusted, thus producing the desired wave profile (e.g., style, size and speed, etc.).

Referring to FIGS. 3-6, four cross-sectional views of the bottom surface 110 and respective water line 128 along the channel 102 are shown. Specifically, the cross-sectional views along lines A-A', B-B', C-C', and D-D' show that the bottom surface 110 slopes downward toward the water outlet 106 and the sidewall 108 of the waving forming channel 102. The water lines 128 in these figures show how the water volume builds up and forms waves corresponding to the slope and longitudinal distance along the channel and toward the back-pressure barrier 112.

Figure 7:
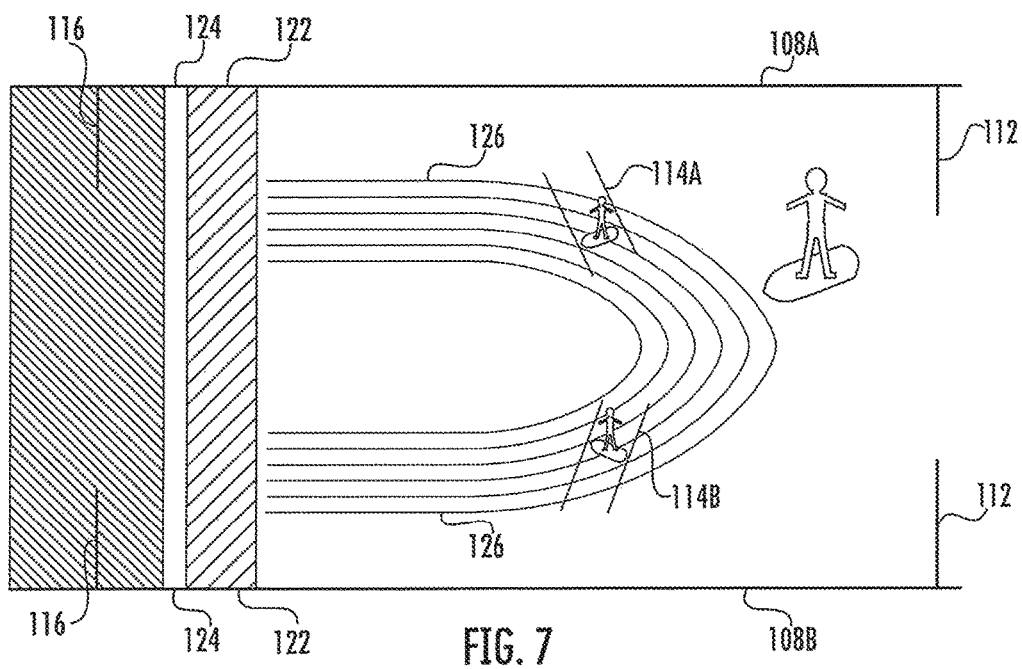
FIG. 7 is a top view of a wave generating system, according to another embodiment of the present invention.

Referring to FIG. 7, according to another embodiment of the present invention, the channel 102 can also have two sidewalls 108A and 108B. The bottom surface 110 slopes downward from a central axis of the channel 102 to both side walls 108A and 108B and from a longitudinal point on the channel 102 to the water outlet 106. As such, continuous wave 114A and 114B can be created at both sides of the channel 102 for multiple surfers to ride simultaneously.

Figure 8:
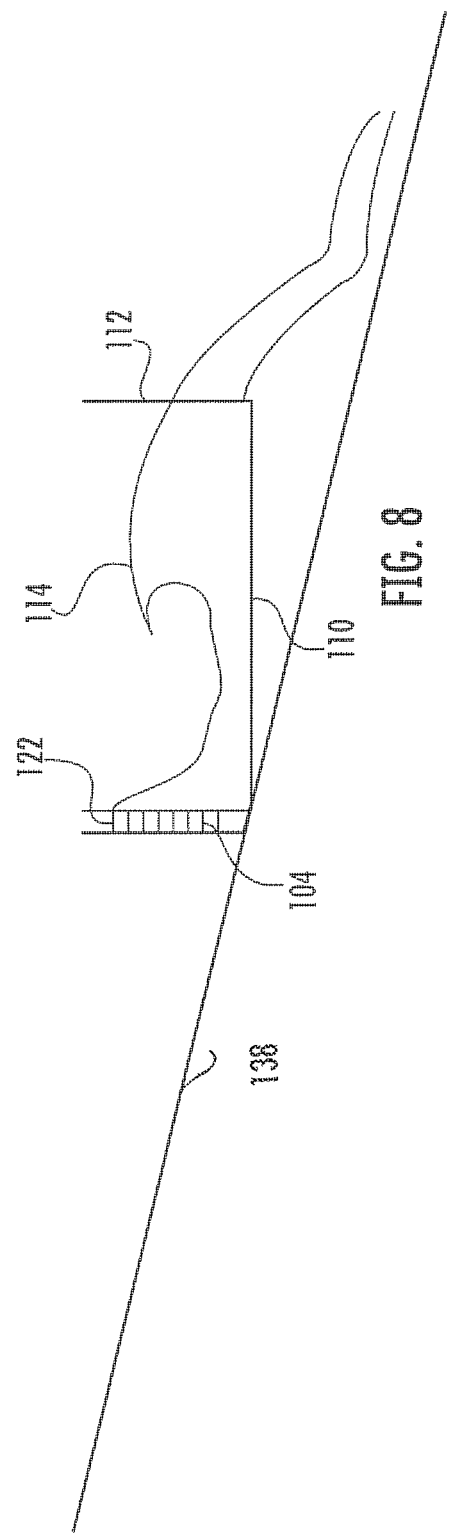
FIG. 8 is a side view of a wave generating system implemented in a river valley, according to another embodiment of the present invention.
Figure 9:
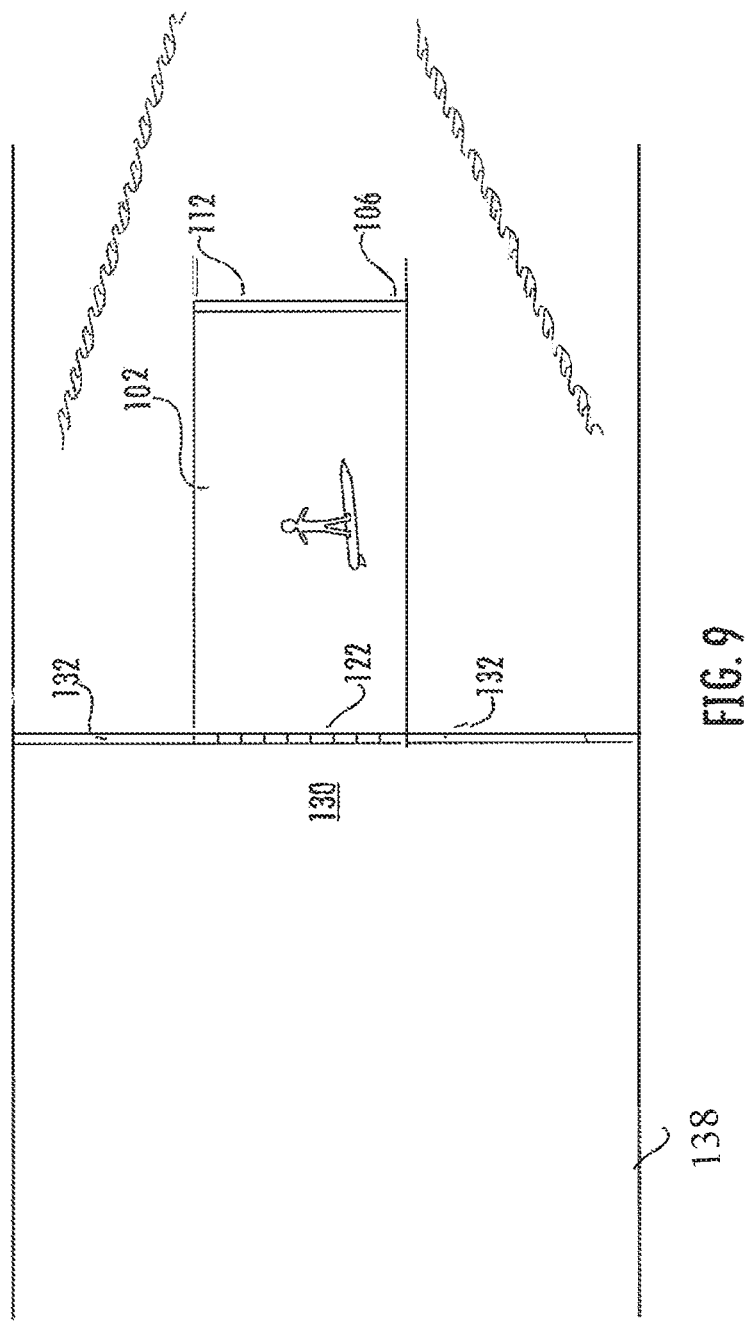
FIG. 9 is a top view of the wave generating system of FIG. 8.

Referring FIGS. 8-9, according to one embodiment of the present invention, a wave generating system 100 is implemented in downstream of a river valley 138. Specifically, the water inlet 104 of the channel 102 is positioned on a settling area 130 of the river valley 138 between dams 132. Water passing the water inlet 104 will have an adequate head pressure before entering the channel 102. This configuration can significantly reduce the energy cost of operating the system 100.

Figure 10:
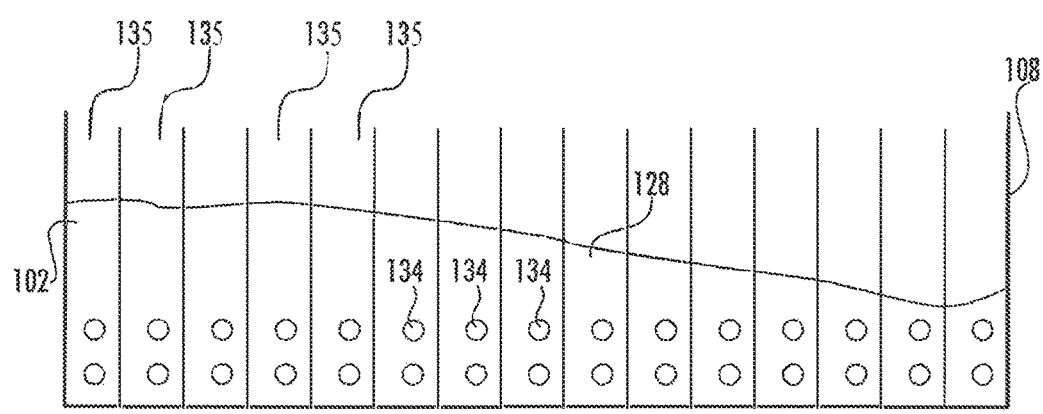
FIG. 10 is a cross sectional view a wave generating system at water inlet, according to one embodiment of the present invention.

Referring to FIG. 10, a plurality of containers 135 can be used to store water before entering the channel 102. The plurality of containers 135 can be independently filled by a pump via respective pump outlets 134 or filled by natural water flow as shown in FIGS. 8-9. The hydraulic head (e.g., height) inside the plurality of containers 135 can be controlled independently to create a desired water line 128 at the water inlet 102. Each of the plurality of containers 135 can also include a hydraulic head regulator (not shown) configured to regulate a hydraulic head of the water inside the container 135. For example, the hydraulic head regulator can be an overflow gate to ensure certain amount of water remains at each of the plurality of container 135 to create a specific hydraulic head, but any component capable of regulating (e.g., increasing or decreasing) hydraulic head within the container 135 can be used.

Figure 11:
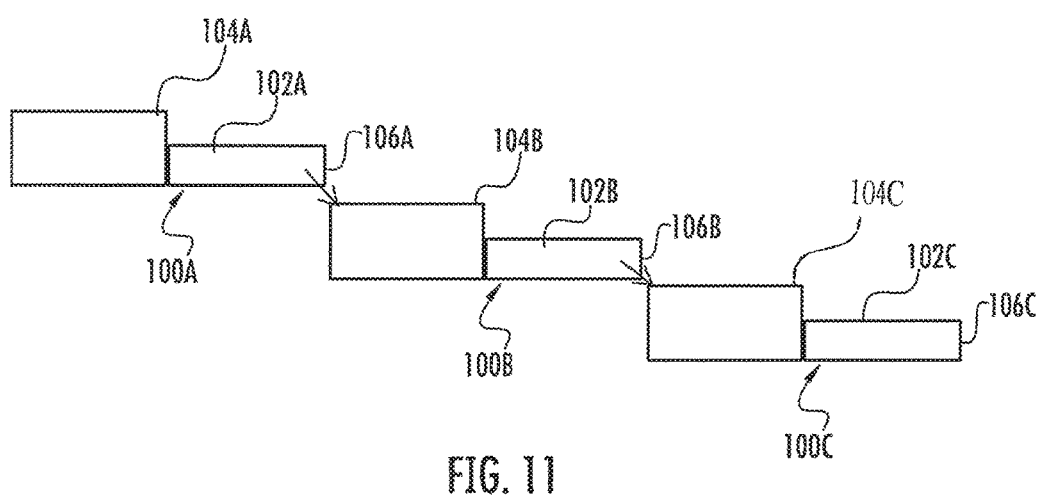
FIG. 11 is a side view of a wave generating system having a cascade arrangement, according to another embodiment of the present invention.

Referring to FIG. 11, according to another embodiment of the present invention, a series of sets of wave-forming systems are installed in a cascading mode. Specifically, three sets of wave-generating systems 100A, 100B and 100C are positioned at three elevations such that a wave-forming system (e.g., 100B) at a lower altitude can utilize the water flowing downward from a wave generating system (e.g., 100A) at a higher altitude. System 100A includes water inlet 104A. In other words, water released from the water outlet 106A of channel 102A at a higher altitude is configured to be used as a water source to water inlet 104B for the system at a lower altitude (e.g., 100B). The water outlet 106B of channel 102B is configured to be used as a water source to water inlet 104C to channel 102C for the system at a lower altitude (e.g., 100C). System 100C includes water outlet 106C. This arrangement can provide multiple wave sites in an energy efficient manner.

Figure 12:
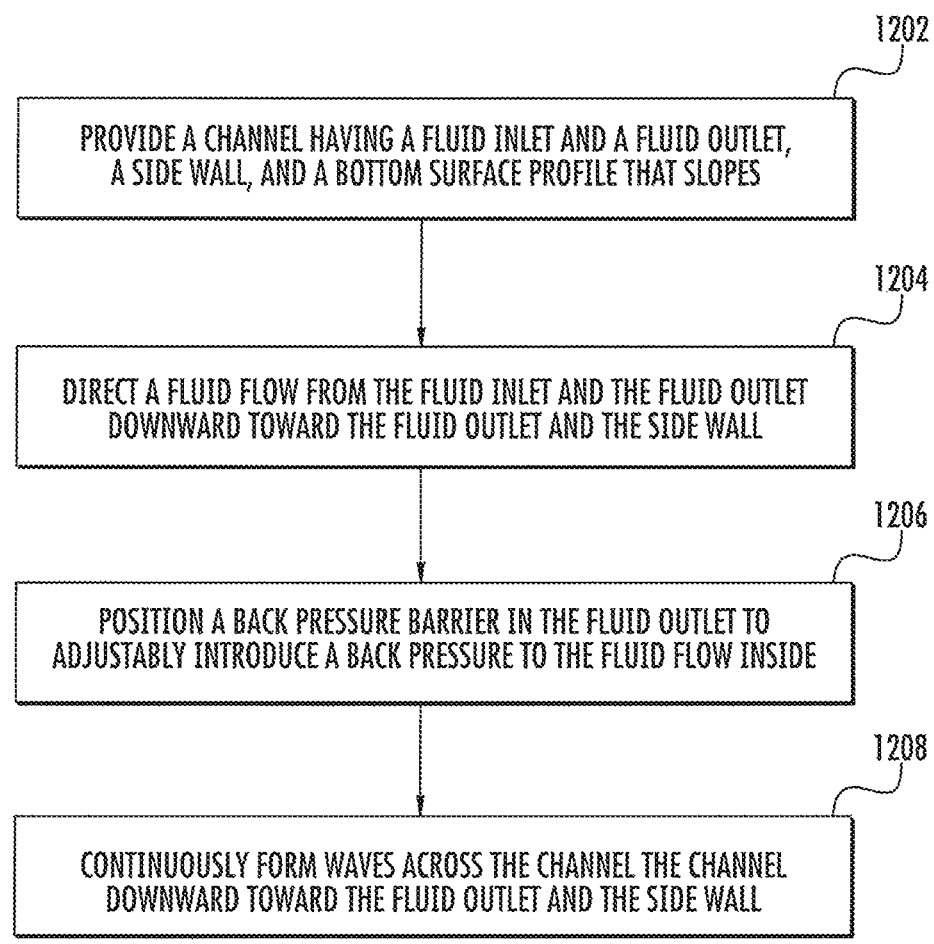
FIG. 12 is a flow chart of method for, generating waves, according to one embodiment of the present invention.

Referring to FIG. 12, a method of generating waves includes providing a channel having a water inlet and a water outlet, a side wall, and a bottom surface having a profile that slopes downward toward the water outlet and the side wall at step 1202. At step 1204, a water flow is directed from the water inlet and the water outlet. At step 1206, a back-pressure barrier is positioned for adjustable introduction of a back pressure to the water flow inside the channel. At step 1208, waves are formed continuously across the channel.

The wave generating system 100 is configurable. A plurality of variables of the system 100 can be adjusted to achieve a desired type, shape, speed, and size of wave suitable for surfers of varying levels of surfing experience. Specifically, the variables include water condition (e.g., rate and volume) at the water inlet 104, water rate inside the wave-forming channel, depth and bottom surface profile of the channel 102, location, orientation, dimension, and shape of the back-pressure barrier 112. For example, by adjusting filters and vanes on the water inlet 102, a desired flow condition can be achieved at the water inlet 102. As another example, the profile of the bottom surface 110 of the wave-forming channel 102 can be made according to a specific bathymetry (e.g., steeper slope, shallower slope, etc.) to generate waves suitable for certain level of surfers. Shallower slopes will allow the wave to slowly steepen and then crumble softly. Steeper slopes can force the wave up quicker and the crumbles slide heavily down a steep face.

The wave-generating system 100 is simple to construct, easy to operate, easy to use and reliable. The system 100 can be used to teach surfing beginners the skills necessary for surf-riding without exposing them to dangers faced by experienced surfers, and the system 100 is readily modified to create waves for experienced surfers. The system 100 can also be used to provide an apparatus for testing boat models subjected to ocean wave conditions.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A method for generating waves comprising:
providing a channel having a water inlet and a water outlet opposite the water inlet, a first side wall, and a bottom surface profile that includes a shallow portion beside a deeper portion with a sloped surface therebetween being configured to slope downward in a direction of the first side wall in a first side of the channel, and the sloped surface, at an end of the shallow portion nearer the water outlet, slopes downward toward the water outlet and the first side wall;
directing a water flow from the water inlet at a first movement and a first layer in the channel to the water outlet;
positioning a back pressure barrier in the water outlet to adjustably introduce a back pressure to the water flow inside the channel to create a water flow at a second movement slower than the first movement and in a second layer above the first layer to produce a hydraulic jump where the water flow at the second movement and the water flow at the first movement meet; and
continuously forming waves across the channel based on the hydraulic jump.

2. The method of claim 1, further comprising conditioning the water flow from the water inlet by a flow conditioner at the water inlet to control a flow condition at the water inlet.

3. The method of claim 2, wherein the conditioning includes reducing a flow turbulent at the water inlet.

4. The method of claim 2, wherein the flow conditioner includes at least one vane and the conditioning includes orienting the water flow toward the first side wall using the at least one vane.

5. The method of claim 1, further comprising adjusting at least one or more of number and position of panels of the back pressure barrier to form a specific wave profile in the channel.

6. The method of claim 1, wherein a slope profile of the bottom surface profile to form a specific wave profile such that a steeper slope angle of the slope profile being configured to create a second wave profile that curls over to create an interior portion of a barreling wave.

7. The method of claim 1, wherein the channel further comprises a second side wall and the bottom surface profile further comprise a second deeper portion beside the shallow portion with a second sloped surface therebetween being configured to slope downward in a direction of the second side wall of a second sided of the channel, and the second sloped surface, at an end of the shallow portion nearer the water outlet slopes downward from a central axis of the channel to both the first and second side walls and from a longitudinal point on the channel to the water outlet, such that continuous waves are formed at both the first and second sides of the channel.

8. The method of claim 1, wherein the channel is a first channel; and further comprising:
providing a second channel at a lower altitude relative to the first channel, the second channel having a water inlet and a water outlet, a first side wall, and a bottom surface profile that slopes downward toward the water outlet and the first side wall, wherein the water inlet of the second channel is positioned to receive water from the water outlet of the first channel at a higher altitude;
directing a water flow from the water inlet to the water outlet of the second channel;
positioning a back pressure barrier in the water outlet of the second channel to adjustably introduce a back pressure to the water flow inside the second channel; and
continuously forming waves across the second channel.

9. A wave-forming system comprising:
a channel having a water inlet and a water outlet, the channel directing a flow of water from the water inlet to the water outlet, the channel having a formed bottom surface defined by a shallow portion formed at the water inlet and a deeper portion between the shallow portion and the water outlet, the shallow portion transitioning into the deeper portion via a curved slope extending along at least one side and one end of the shallow portion such that water entering the channel at the shallow portion has a velocity greater than the velocity of water exiting the deeper portion, the higher velocity water impacting the lower velocity water and causing a hydraulic jump along an adjustable front whereby the water in the deeper portion of the channel rises above a level of the water in the shallow portion of the channel thereby creating a wave at the front as the curvature of the curved slope directs the higher velocity water downward into the lower velocity water.

10. The wave-forming system of claim 9, wherein the curvature of the curved slope is selected to produce a wave configuration curving in an upstream direction.

11. The wave-forming system of claim 10, wherein the curved slope extending from the shallow portion to the deeper portion has an arcuate configuration.

12. The wave-forming system of claim 11, wherein the curved slope has a varying rate of curvature from one end to another end.

13. The wave-forming system of claim 12, wherein the curvature of the slope varies between 1:2 and 1:10.

14. The wave-forming system of claim 12, wherein the curvature of the slope is less at a beginning end of the shallow area than at an ending end of the shallow area.

15. The wave-forming system of claim 9, and including an adjustable barrier positioned at least partially in the water outlet in a position to block at least some of the water exiting from the deeper portion of the channel for controlling the location of the wave formed at the intersection of the higher velocity water and the lower velocity water.

16. The wave-forming system of claim 9, and including means positioned in the inlet portion of the channel for reducing turbulence in the water flowing into the shallow portion of the channel.

17. The wave-forming system of claim 16, and including means positioned in the inlet portion of the channel to control the direction of flow of at least some of the water as it enters the channel.

18. The wave-forming system of claim 17, wherein the means for controlling the direction of flow of at least some of the water entering the channel comprises one or more vanes inserted in the water in an orientation for directing the water flow angularly with respect to the direction of the channel.

19. The wave-forming system of claim 16, wherein the means for reducing turbulence comprises at least one filter extending at least partially across the width of the shallow portion of the channel at the inlet thereof.

20. The wave-forming system of claim 9, wherein the shallow portion is formed with a deeper portion extending along each side of the shallow portion such that fronts are formed on each side of the shallow portion.

21. A wave-forming system comprising:
a channel having a water inlet, a water outlet opposite the water inlet and a first side wall, the channel being configured to direct water flow of water from the water inlet at a controlled rate in a direction of the water outlet and the first side wall and along a bottom surface having a bottom surface profile including a shallow portion beside a deeper portion with a sloped surface therebetween being configured to slope downward in a direction of the first side wall of the channel, and the sloped surface, at an end of the shallow portion nearer the water outlet, slopes downward toward the water outlet and the first side wall;
water inlet conditioners to control the controlled rate of the water to a first movement rate at a first layer in a portion of the channel, the water inlet conditioner including at least one controlled conditioner; and
an adjustable back pressure barrier, in the water outlet, being configured to adjust a speed and orientation of a hydraulic jump formed by adjusting a back pressure to the water flow inside the channel to create a water flow at a second movement rate slower than the first movement rate and in a second layer above the first layer wherein the water flow at the second movement rate and the water flow at the first movement rate meet to cause the hydraulic jump and formation of a wave having a wave profile across the channel based on the hydraulic jump.

22. The wave-forming system of claim 21, wherein the sloped surface of the bottom surface slopes downward and toward the sidewall at different rates at different locations of the channel.

23. The wave-forming system of claim 21, wherein the back pressure barrier comprises one or more independently-positionable panels.

24. The wave-forming system of claim 22, wherein the one or more independently-positionable panels comprises panels being angled relative to the direction of the water flow at the first movement rate in the channel to adjust the hydraulic jump to adjust at least one of a size, speed, and style of the wave profile of the wave.

* * * * *